(12) United States Patent
Bortoletto et al.

(10) Patent No.: US 11,263,213 B2
(45) Date of Patent: Mar. 1, 2022

(54) DATABASE STATISTICAL HISTOGRAM FORECASTING

(71) Applicant: INTERNATIONAL BUSINESS MACHINES CORPORATION, Armonk, NY (US)

(72) Inventors: Felipe G. Bortoletto, Campinas (BR); Reinaldo T. Katahira, Anhagabau (BR); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 16/737,277

(22) Filed: Jan. 8, 2020

(65) Prior Publication Data

US 2020/0142896 A1    May 7, 2020

Related U.S. Application Data

(63) Continuation of application No. 15/629,077, filed on Jun. 21, 2017, now Pat. No. 10,572,482, which is a
(Continued)

(51) Int. Cl.
*G06F 16/2453*   (2019.01)
*G06F 16/2458*   (2019.01)

(52) U.S. Cl.
CPC .... *G06F 16/24545* (2019.01); *G06F 16/2462* (2019.01)

(58) Field of Classification Search
CPC .................. G06F 16/24545; G06F 16/2462
(Continued)

(56) References Cited

U.S. PATENT DOCUMENTS 5,870,752 A *  2/1999  Gibbons ............. G06F 16/2358
5,924,088 A    7/1999  Jakobsson et al.
(Continued)

FOREIGN PATENT DOCUMENTS

CN        102103638        6/2011

OTHER PUBLICATIONS

Arroyo et al., "Forecasting with Interval and Histogram Data: Some Financial Applications", in Handbook of Empirical Economics and Finance, New York: Chapman & Haii/CRC, 2010, pp. 247-279. (Year: 2010).
(Continued)

*Primary Examiner* — Phuong Thao Cao
(74) *Attorney, Agent, or Firm* — Schmeiser, Olsen & Watts; Nicholas L. Cadmus

(57) ABSTRACT

A method and system for forecasting a histogram in a database system is provided. The method includes determining that database table statistics and historical statistical histograms associated with specified subject matter have been previously retrieved. The database table statistics and historical statistical histograms are retrieved and determined to be frequency based histograms. Historical target values associated with the historical statistical histograms are identified and new target values associated with the historical target values are identified. A value identifying a number of occurrences for identified target values comprising the new target values and the historical target values is forecast and database table histograms comprising the identified target values are stored.

16 Claims, 9 Drawing Sheets

Related U.S. Application Data continuation of application No. 14/598,734, filed on Jan. 16, 2015, now Pat. No. 9,798,775.

(58) Field of Classification Search
USPC .......................................................... 707/716
See application file for complete search history.

(56) References Cited

U.S. PATENT DOCUMENTS

| | | | | |
|---|---|---|---|---|
| 6,012,064 | A * | 1/2000 | Gibbons | G06F 16/284 707/700 |
| 6,052,689 | A | 4/2000 | Shanmugavelayut | |
| 6,108,647 | A | 8/2000 | Poosala et al. | |
| 6,263,345 | B1 | 7/2001 | Farrar et al. | |
| 6,278,989 | B1 | 8/2001 | Chaudhuri | |
| 6,360,214 | B1 | 3/2002 | Ellis et al. | |
| 6,366,901 | B1 * | 4/2002 | Ellis | G06F 16/2462 |
| 6,460,045 | B1 | 10/2002 | Aboulnaga et al. | |
| 6,691,099 | B1 | 2/2004 | Mozes | |
| 6,732,085 | B1 | 5/2004 | Mozes | |
| 6,865,567 | B1 | 3/2005 | Oommen | |
| 7,386,536 | B1 | 6/2008 | Ramesh et al. | |
| 7,512,574 | B2 | 3/2009 | Haas | |
| 7,551,776 | B2 | 6/2009 | Jeffrey | |
| 7,778,996 | B2 | 8/2010 | Burger | |
| 7,987,180 | B2 | 7/2011 | Lim et al. | |
| 8,229,917 | B1 * | 7/2012 | Aneas | G06F 16/24545 707/713 |
| 8,386,639 | B1 * | 2/2013 | Galvin | G06Q 30/02 709/238 |
| 8,392,406 | B1 | 3/2013 | Emekci et al. | |
| 8,972,378 | B2 | 3/2015 | Halverson et al. | |
| 9,798,775 | B2 | 10/2017 | Bortoletto | |
| 2002/0198867 | A1 * | 12/2002 | Lohman | G06F 16/24549 |
| 2002/0198896 | A1 | 12/2002 | Chaudhuri | |
| 2003/0126127 | A1 | 7/2003 | Abdo | |
| 2003/0135485 | A1 | 7/2003 | Leslie | |
| 2003/0161463 | A1 | 8/2003 | Galvin | |
| 2003/0187830 | A1 | 10/2003 | Chang | |
| 2005/0223019 | A1 | 10/2005 | Das | |
| 2006/0149695 | A1 | 7/2006 | Bossman | |
| 2007/0027837 | A1 | 2/2007 | Kutsch | |
| 2007/0192372 | A1 | 8/2007 | Bestgen | |
| 2007/0276835 | A1 * | 11/2007 | Murthy | G06F 21/6227 |
| 2008/0046455 | A1 * | 2/2008 | Behm | G06F 16/24539 |
| 2008/0059125 | A1 | 3/2008 | Fraser | |
| 2008/0133458 | A1 | 6/2008 | Zabback | |
| 2008/0140347 | A1 | 6/2008 | Ramsey | |
| 2008/0172354 | A1 * | 7/2008 | Zuzarte | G06F 16/24545 |
| 2008/0275841 | A1 | 11/2008 | Keller | |
| 2009/0018992 | A1 | 1/2009 | Zuzarte | |
| 2009/0083215 | A1 * | 3/2009 | Burger | G06F 16/2462 |
| 2009/0112792 | A1 | 4/2009 | Barsness | |
| 2009/0150413 | A1 | 6/2009 | Basu | |
| 2010/0030728 | A1 | 2/2010 | Chakkappen | |
| 2010/0036804 | A1 | 2/2010 | Blamer | |
| 2010/0036805 | A1 | 2/2010 | Blamer | |
| 2011/0060731 | A1 | 3/2011 | Al-Omari | |
| 2011/0093477 | A1 * | 4/2011 | Aldridge | G06F 17/18 707/752 |
| 2011/0145223 | A1 | 6/2011 | Cormode | |
| 2011/0252020 | A1 | 10/2011 | Lim | |
| 2012/0084287 | A1 | 4/2012 | Lakshminarayan | |
| 2012/0191639 | A1 * | 7/2012 | Katahira | G06N 20/00 706/50 |
| 2013/0166486 | A1 * | 6/2013 | Kim | G06Q 10/101 706/46 |
| 2013/0346988 | A1 | 12/2013 | Bruno | |
| 2014/0095474 | A1 | 4/2014 | Chakkappen | |
| 2014/0114950 | A1 * | 4/2014 | Halverson | G06F 16/21 707/713 |
| 2014/0181075 | A1 | 6/2014 | Korlapati | |
| 2015/0186464 | A1 | 7/2015 | Seputis | |
| 2015/0278355 | A1 | 10/2015 | Hassanpour | |
| 2015/0370857 | A1 * | 12/2015 | Nica | G06F 16/2465 707/752 |
| 2016/0098662 | A1 | 4/2016 | Voss | |
| 2016/0110426 | A1 | 4/2016 | Gaza | |
| 2016/0162599 | A1 | 6/2016 | Dickie | |
| 2016/0210329 | A1 | 7/2016 | Felipe | |
| 2017/0286487 | A1 | 10/2017 | Bortoletto | |

OTHER PUBLICATIONS

Augustyn, D. R., "Applying Prediction of Attribute Value Distribution for Improvement of Query Selectivity Estimation Accuracy", Studia Informatica, vol. 34, No. 2A, 2013, pp. 23-42. (Year: 2013).

Friedman, Mark J.; List of IBM Patents or Patent Applications Treated as Related; 1 page.

PCT Notification of Transmittal of the International Search Report and the Written Opinion of the International Searching Authority, or the Declaration; May 4, 2016; 12 pages.

PredictHistogram (DMX) [online]; Microsoft Corporation; retrieved from the Internet on Sep. 9, 2014; URL: http://msdn.microsoft.com/en-IN/library/ms132060.aspx; 3 pages.

Mell, Peter et al.; "The NIST Definition of Cloud Computing;" National Institute of Standards and Technology; Special Publication 800-145; Sep. 2011; 7 pages.

\* cited by examiner

DATABASE STATISTICAL HISTOGRAM FORECASTING

CROSS REFERENCE TO RELATED APPLICATIONS

This application is a continuation application claiming priority to Ser. No. 15/629,077 filed Jun. 21, 2017, now U.S. Pat. No. 10,572,482 issued Feb. 25, 2020 which is a continuation application claiming priority to Ser. No. 14/598,734 filed Jan. 16, 2015 now U.S. Pat. No. 9,798,775 issued Oct. 24, 2017, the contents of which are hereby incorporated by reference.

FIELD

The present invention relates generally to a method for forecasting histograms and in particular to a method and associated system for forecasting histograms based on database table statistics and historical statistical histograms associated with specified subject matter has been previously retrieved.

BACKGROUND

Current (driving direction) algorithms may include a previously gathered artifact (e.g., street's speed limit, traffic lights, latitude and longitude coordinates, and additionally elusive information) in order to determine an outcome (e.g., a best direction). A standard structured query language (SQL) process may enable a similar decision tree in which statistics comprise a prominent role to formulate an optimal database access path or execution plan.

Standard database statistical histograms provide vital information to a SQL optimizer in a relational database management system (RDBMS). In order to gather statistical metadata, a partial table partition scan is necessary, thereby consuming time and hardware resources.

In extract, transform, and load (ETL) systems, gathering statistics may be time consuming such that after loading a large table partition it may be necessary to gather the statistics to provide guidance to an optimizer which may take hours to complete. For example, an optimal query might be run after the completion of a gathering statistics step which has taken place after a load partitioning step in a serialized manner.

Accordingly, there exists a need in the art to overcome at least some of the deficiencies and limitations described herein above.

SUMMARY

A first aspect of the invention provides a histogram forecasting method comprising: determining, by a computer processor of a database system, that a plurality of database table statistics and historical statistical histograms associated with specified subject matter have been previously retrieved; retrieving, by the computer processor from a historical statistical histogram database, the plurality of database table statistics and the historical statistical histograms associated with the specified subject matter; determining, by the computer processor, that the historical statistical histograms comprise frequency based histograms; identifying, by the computer processor, historical target values associated with the historical statistical histograms; forecasting, by the computer processor, new target values associated with the historical target values; forecasting, by the computer processor, a value identifying a number of occurrences for identified target values comprising the new target values and the historical target values; and storing, by the computer processor within the database system, database table histograms comprising the identified target values.

A second aspect of the invention provides a histogram forecasting method comprising: determining, by a computer processor of a database system, that a plurality of database table statistics and historical statistical histograms associated with specified subject matter have been previously retrieved; retrieving, by the computer processor from a historical histogram database, the plurality of database table statistics and the historical statistical histograms associated with the specified subject matter; determining, by the computer processor, that the historical statistical histograms comprise height balanced based histograms; identifying, by the computer processor, historical endpoint values associated with the historical statistical histograms; normalizing, by the computer processor, differing bins of the historical statistical histograms to a common number of bins; forecasting, by the computer processor based on the historical endpoint values, future endpoint values associated with each bin of the common number of bins; forecasting, by the computer processor, a value identifying a number of occurrences of the future endpoint values within each the bin; and storing, by the computer processor within the database system, database table histograms comprising the future endpoint values.

A third aspect of the invention provides a database system comprising a computer processor coupled to a computer-readable memory unit, the memory unit comprising instructions that when executed by the computer processor implements a histogram forecasting method comprising: determining, by the computer processor, that a plurality of database table statistics and historical statistical histograms associated with specified subject matter have been previously retrieved; retrieving, by the computer processor from a historical statistical histogram database, the plurality of database table statistics and the historical statistical histograms associated with the specified subject matter; determining, by the computer processor, that the historical statistical histograms comprise frequency based histograms; identifying, by the computer processor, historical target values associated with the historical statistical histograms; forecasting, by the computer processor, new target values associated with the historical target values; forecasting, by the computer processor, a value identifying a number of occurrences for identified target values comprising the new target values and the historical target values; and storing, by the computer processor within the database system, database table histograms comprising the identified target values.

A fourth aspect of the invention provides a computer program product, comprising a computer readable hardware storage device storing a computer readable program code, the computer readable program code comprising an algorithm that when executed by a computer processor of a database system server implements a histogram forecasting method, the method comprising: determining, by the computer processor, that a plurality of database table statistics and historical statistical histograms associated with specified subject matter have been previously retrieved; retrieving, by the computer processor from a historical statistical histogram database, the plurality of database table statistics and the historical statistical histograms associated with the specified subject matter; determining, by the computer processor, that the historical statistical histograms comprise frequency based histograms; identifying, by the computer processor, historical target values associated with the historical statistical histograms; forecasting, by the computer processor, new target values associated with the historical target values; forecasting, by the computer processor, a value identifying a number of occurrences for identified target values comprising the new target values and the historical target values; and storing, by the computer processor within the database system, database table histograms comprising the identified target values.

A fifth aspect of the invention provides a computer program product, comprising a computer readable hardware storage device storing a computer readable program code, the computer readable program code comprising an algorithm that when executed by a computer processor of a database system server implements a histogram forecasting method, the method comprising: determining, by the computer processor, that a plurality of database table statistics and historical statistical histograms associated with specified subject matter have been previously retrieved; retrieving, by the computer processor from a historical histogram database, the plurality of database table statistics and the historical statistical histograms associated with the specified subject matter; determining, by the computer processor, that the historical statistical histograms comprise height balanced based histograms; identifying, by the computer processor, historical endpoint values associated with the historical statistical histograms; normalizing, by the computer processor, differing bins of the historical statistical histograms to a common number of bins; forecasting, by the computer processor based on the historical endpoint values, future endpoint values associated with each bin of the common number of bins; forecasting, by the computer processor, a value identifying a number of occurrences of the future endpoint values within each the bin; and storing, by the computer processor within the database system, database table histograms comprising the future endpoint values.

The present invention advantageously provides a simple method and associated system capable of forecasting histograms based on database table statistics and historical statistical histograms.

DETAILED DESCRIPTION

Figure 1:
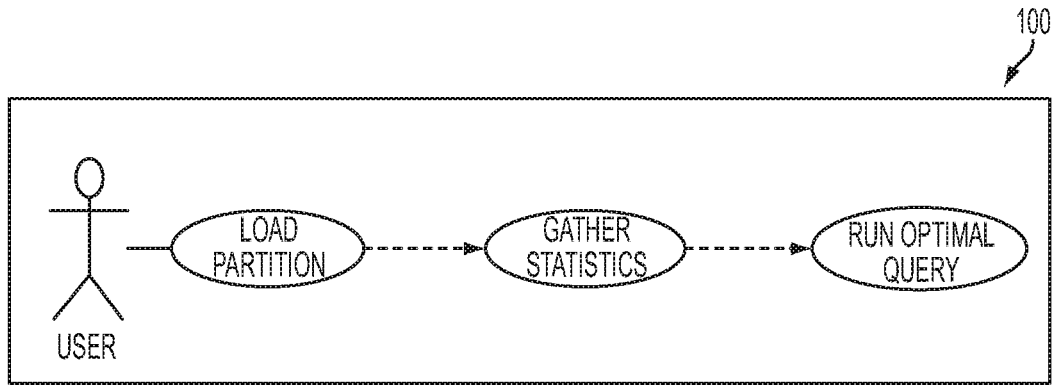
FIG. 1 illustrates a system for serially gathering statistics and running a query, in accordance with embodiments of the present invention.

FIG. 1 illustrates a system 100 for serially gathering statistics and running a query, in accordance with embodiments of the present invention. System 100 enables a methodology for running a query such as an optimal query. System 100 allows a database partition to be loaded with data by, inter alia, ETL processes. Thereafter, a partial or full table partition scan is run to gather statistics associated with the database table partition. The statistics may be referred to a metadata. As described, supra, gathering statistics (e.g., with respect to driving directions) consumes considerable time and hardware resources. For example, with respect to a large table partition, gathering statistics may take an hour or more to complete. Once the statistics have been gathered, an optimal query may be run by the query optimizer such as an SQL optimizer.

Figure 2:
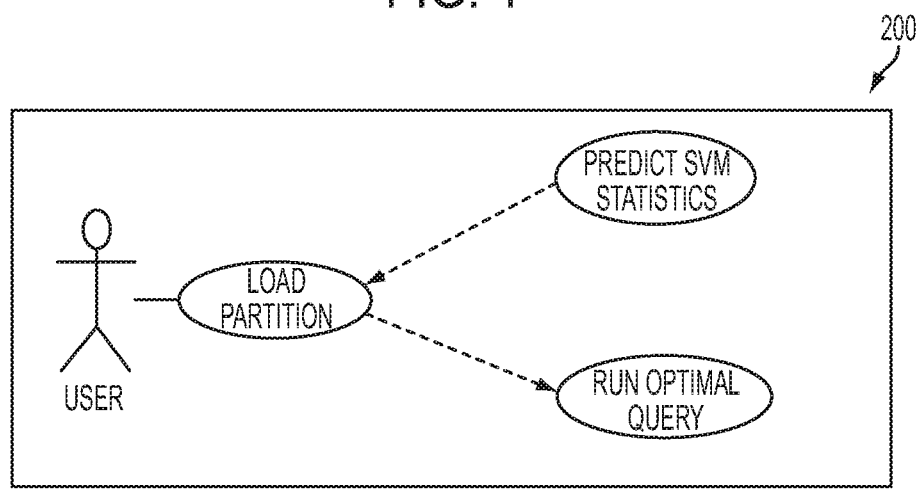
FIG. 2 illustrates a system for loading a table partition with data from ETL processes, in accordance with embodiments of the present invention.

FIG. 2 illustrates a system 100 for loading a table partition with data from ETL processes, in accordance with embodiments of the present invention. Table partition statistics are forecast (or predicted) using a data mining algorithm based upon previously gathered table partition statistics. For example, with respect to range partitioned tables by date, previously gathered table partition statistics may be associated with one or more table partitions for earlier dates. By using previously gathered statistics and a data mining algorithm, patterns in the statistics may be recognized and used to forecast future statistics. The forecasting of table partition statistics (enabled by system 200) may only take a few seconds to complete compared to an hour or more necessary for a full or partial table scan. When the forecasting of table partition statistics is complete, the optimal query may be run using the query optimizer. The forecasting of table partition statistics may be performed before, during, or after a data load of the partition but before the optimal query is run. Similarly, the optimal query may also be run before, during, or after the data load of the partition, but after the forecasting of table partition statistics, since table partition statistics are forecast and not gathered.

The term "statistics" (or "metadata") is defined herein as obtained information associated with the table partition. Additionally, statistics refer to allocated storage space for the table partition.

In a typical statistical gathering process, it may be necessary to gather statistics to provide guidance to an optimizer typically comprising a very time consuming process. System 200 enables a process and database system for forecasting database statistical histograms based on previously gathered statistics. Additionally, the aforementioned forecasting process may be used within a same table based on historical statistics or partitioned tables by date based on previous table partitions statistics. Likewise, system 200 enables a process for forecasting a table column statistical histogram using data mining techniques based on previously gathered statistical histograms thereby saving time and hardware resources. Additionally (after loading a large table partition), typical systems gather statistic to provide guidance to an optimizer otherwise queries may not run optimally. System 200 allows an optimal query to be run even during a data load partition process because a support vector machine (SVM) statistics prediction process has already estimated statistics.

Figure 3:
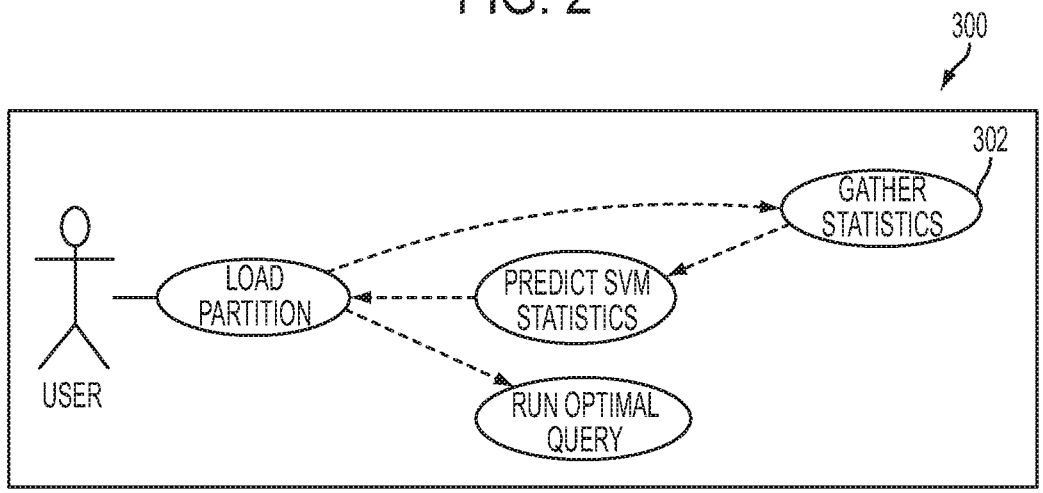
FIG. 3 illustrates a system for postponing a statistical gathering process, in accordance with embodiments of the present invention.

FIG. 3 illustrates a system 300 for postponing a statistical gathering process, in accordance with embodiments of the present invention. System 300 comprises a component 302 for gathering statistics. External factors (e.g., the economy, natural disasters, etc.) may dramatically influence business directions and eventually the load of systems and associated table partitions. Accordingly, it would be unwise to forecast table partition statistics indefinitely. Therefore, system 300 enables a process for occasionally running a partial or full table partition scan to provide a more accurate feedback to a data mining algorithm. The partial or full table partition scan may be run at a convenient time such as when the database may be offline for maintenance or when demand for the database is low. In any case, the partial or full table scan is not necessary for the running of the optimal query.

Figure 4A:
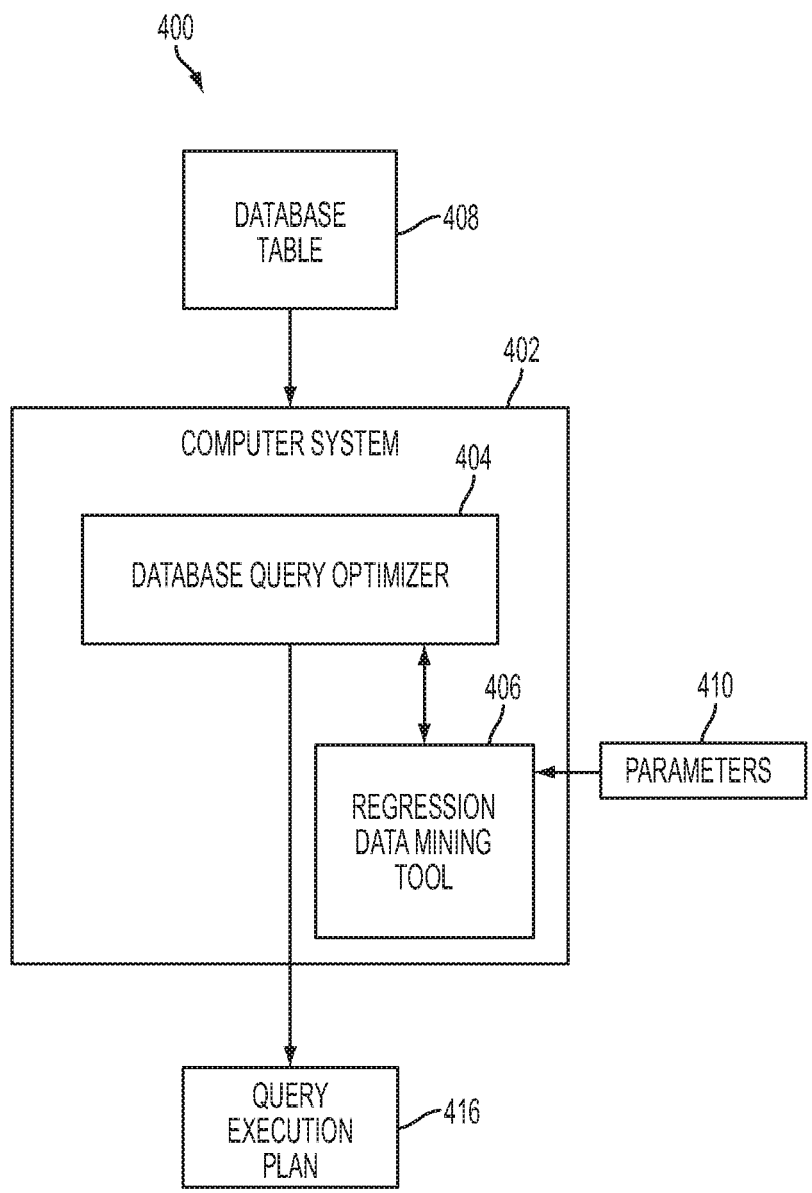
FIG. 4A illustrates a system for forecasting histograms based on database table statistics and historical statistical histograms associated with specified subject matter that has been previously retrieved, in accordance with embodiments of the present invention.

FIG. 4A illustrates a system 400 for forecasting histograms based on database table statistics and historical statistical histograms associated with specified subject matter that has been previously retrieved, in accordance with embodiments of the present invention. System 400 enables a database query optimization process using clustering data mining. System 400 includes a computer system 402 running a database query optimizer 404 (e.g., SQL optimizer) and a regression data mining tool 406 (e.g., implementing an SVM algorithm). Computer system 402 receives scanned data from a database table 408. Regression data mining tool 406 receives parameters 410 to specify a data mining technique. Database query optimizer 404 generates an optimal query plan 416.

In order to generate an estimate column histogram system 400 enables a process for recognizing and normalizing a trend or a pattern within historical histograms for the following attributes:
1. A minimum and maximum target value range configured to slide throughout an x axis across time is identified.
2. A differing number of possible target values comprising a rate of new target values crossing lower and upper boundaries are identified to provide a an accurate prediction. The differing number of possible target values is defined herein as a delta dimension trend.
3. An inner target value trend across time and defined herein as a target value dimension trend.

System 400 enables a method for forecasting frequency histograms or height balanced histograms. A frequency histogram is defined herein as a histogram that includes every target value (or equi-width range of target values) bin comprising an associated row count. A height balanced histogram is defined herein as a histogram that includes every a range of target value bins comprising a same (or approximately equi-depth of bin) split row count.

Figure 4B:
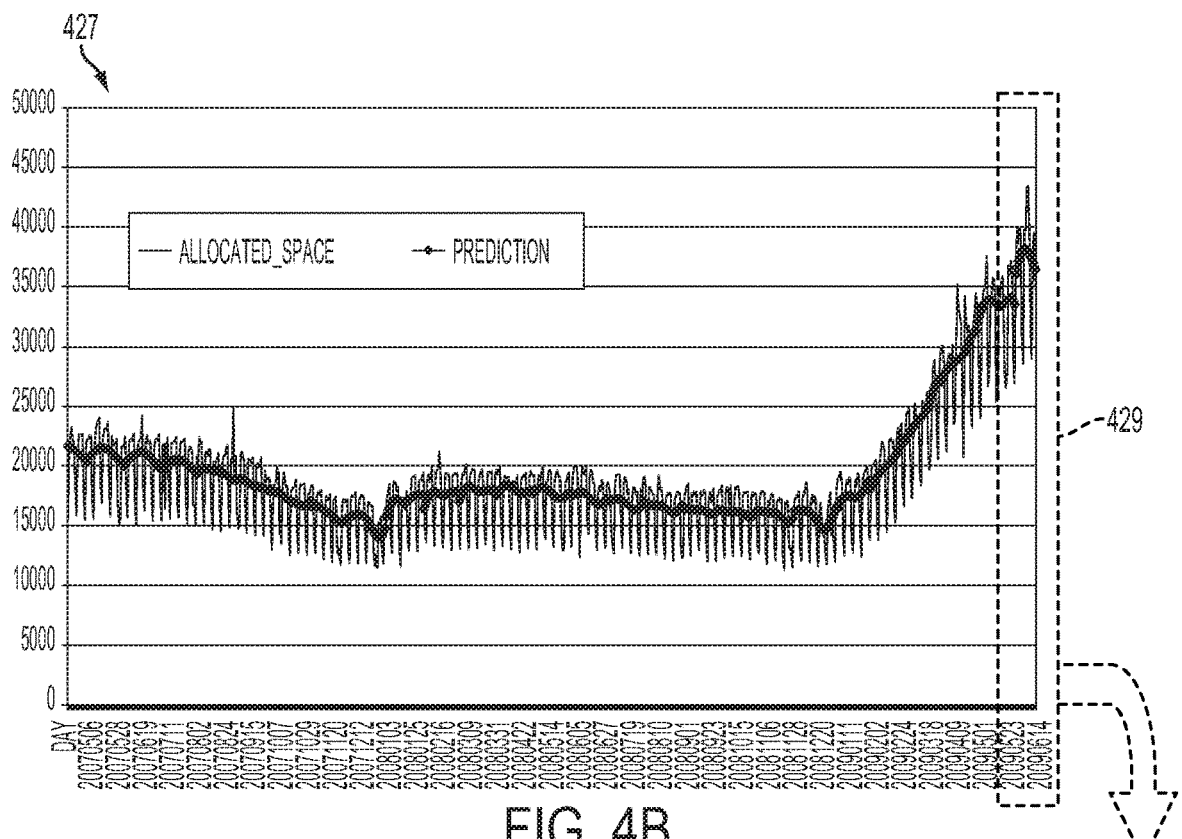
FIG. 4B illustrates a range partitioned table versus allocated storage space in megabytes, in accordance with embodiments of the present invention.

FIG. 4B illustrates a range partitioned table 427 by date from 2007May 11 until 2009 Jun. 14 versus allocated storage space in megabytes, in accordance with embodiments of the present invention. The statistics gathered are for allocated space in storage for the data in the table.

Figure 4C:
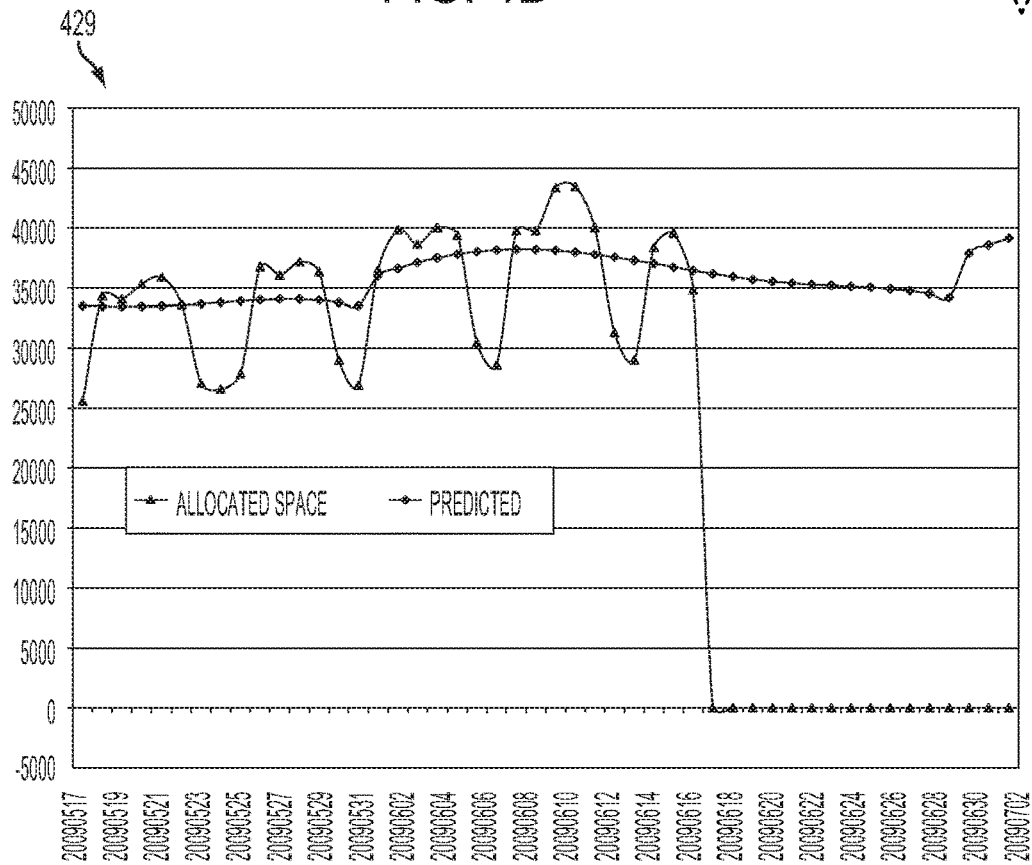
FIG. 4C illustrates a section of the table of FIG. 4B, in accordance with embodiments of the present invention.

FIG. 4C illustrates section 429 of FIG. 4B, in accordance with embodiments of the present invention. Section 429 illustrates a next partition to have data loaded (2009 Jun. 18). The next partition may allocate a space of about 35000 to 45000 megabytes. A data mining algorithm is now applied to the statistics shown in FIG. 4B. The data mining algorithm may be selected from those data mining algorithms known to those skilled in the art. Two such data mining algorithms may be the Autoregressive Moving Average (ARIMA) and Support Vector Machine (SVM) algorithms, with the SVM algorithm being more preferred for the exemplary embodiments. FIG. 4C illustrates results of the predicted allocated storage space overlaying the actual allocated storage. The results were produced using Oracle Data Miner software (Oracle Corporation). Other data mining software may also be used such as the IBM SPSS Statistics from IBM Corporation. The following parameters were used in the SVM algorithm: Gaussian kernel function, standard deviation 0.508197, complexity factor 0.510547, epsilon 0.022535 and convergence tolerance 0.001. Section 429 is again zoomed in to show the predicted allocated storage space for table partitions not yet loaded. Again, it is forecast that the storage allocation for table partitions not yet loaded will be between 35,000 and 45,000 megabytes.

Figure 5:
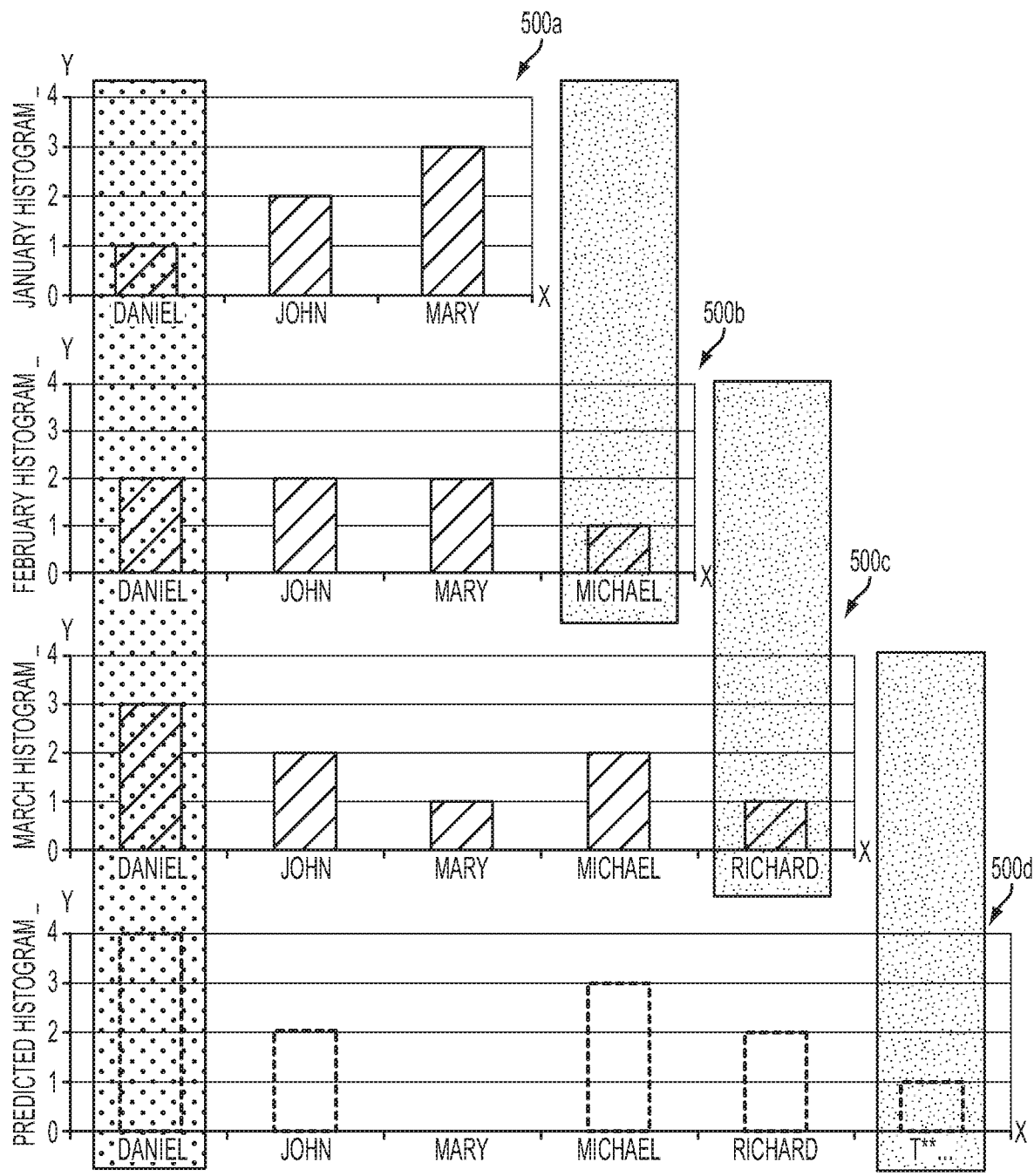
FIG. 5 illustrates an implementation example describing a method for forecasting frequency based histograms, in accordance with embodiments of the present invention.

FIG. 5 illustrates an implementation example describing a method for forecasting frequency based histograms 500, in accordance with embodiments of the present invention. In order to forecast frequency histograms the following attributes are retrieved:
1. A minimum and maximum target value range such that all possible target values are merged and each target value reveals one dimension.
2. A different number of possible target values such that new target values crossing a lower and upper boundaries trend are identified and revealed by analyzing a delta trend via an SVM algorithm.
3. Within a target value trend, each dimension has its own trend using an SVM algorithm. An SVM algorithm is defined herein as a learning algorithm that analyzes data and recognizes patterns used for classification and regression analysis. Given a set of training examples, each marked as belonging to one of two categories, an SVM algorithm builds a model that assigns new examples into one category or the other, making it a non-probabilistic binary linear classifier.

Frequency histograms 500 comprise a January frequency histogram 500*a*, a February frequency histogram 500*b*, a March frequency histogram 500*c*, and a (future predicted) April frequency histogram 500*d* generated based on based on a person column comprising a first name. An x axis (for each of frequency histograms 500) presents all the target values. Likewise, a y axis (for each of frequency histograms 500) presents a row count for an associated target value. For a specific target value "Daniel", a trend of increasing row count across time is identified. For a specific target value "Mary" a trend decreasing across time is identified. Additionally, frequency histograms 500 identify that the upper bound has been raised across time and the new target value predicted by an SVM. Every dimension may be isolated and predicted by an SVM algorithm and eventually a histogram prediction for April is formulated. Data representation associated with January, February, and March is described as follows:

| ENDPOINT_MONTH | ENDPOINT_VALUE | ENDPOINT_COUNT |
| --- | --- | --- |
| 1 | Daniel | 1 |
| 1 | John | 2 |
| 1 | Mary | 3 |

-continued

| ENDPOINT_MONTH | ENDPOINT_VALUE | ENDPOINT_COUNT |
|---|---|---|
| 2 | Daniel | 2 |
| 2 | John | 2 |
| 2 | Mary | 2 |
| 2 | Michael | 1 |
| 3 | Daniel | 3 |
| 3 | John | 3 |
| 3 | Mary | 1 |
| 3 | Michael | 2 |
| 3 | Richard | 1 |

Transforming strings into numerical (ASCII) hexadecimal format using a first three characters is described as follows:

| ENDPOINT_MONTH | SUB | ENDPOINT_VALUE | ENDPOINT_COUNT |
|---|---|---|---|
| 1 | Dan | 44 61 6E | 1 |
| 1 | Joh | 4A 6F 68 | 2 |
| 1 | Mar | 4D 61 72 | 3 |
| 2 | Dan | 44 61 6E | 2 |
| 2 | Joh | 4A 6F 68 | 2 |
| 2 | Mar | 4D 61 72 | 2 |
| 2 | Mic | 4D 69 63 | 1 |
| 3 | Dan | 44 61 6E | 3 |
| 3 | Joh | 4A 6F 68 | 3 |
| 3 | Mar | 4D 61 72 | 1 |
| 3 | Mic | 4D 69 63 | 2 |
| 3 | Ric | 52 69 63 | 1 |

A linear prediction algorithm for a "Daniel" dimension is described as follows:

| ENDPOINT_MONTH | ENDPOINT_VALUE | ENDPOINT_COUNT |
|---|---|---|
| 1 | Daniel | 1 |
| 2 | Daniel | 2 |
| 3 | Daniel | 3 |
| 4 | Daniel | ? |

Based on the previous linear prediction algorithm, a next endpoint_count for a "Daniel" dimension is 4 may be predicted using the following arguments:

A "Delta" dimension comprises:

| ENDPOINT_MONTH | ENDPOINT_VALUE | ENDPOINT_COUNT |
|---|---|---|
| 2 | Michael | 1 |
| 3 | Richard | 1 |
| 4 | ?? | ?? |

A transformed "Delta" dimension comprises:

| ENDPOINT_MONTH | ENDPOINT_VALUE_DELTA | ENDPOINT_COUNT |
|---|---|---|
| 2 | 2 Mic (4D6963) – Mar (4D6172) 1 | 1 |
| 3 | 3 Ric (526963) – Mic (4D6963) 1 | 1 |
| 4 | ????? ?? | ?? |

A next endpoint_count for "Delta" dimension may be determined as 1. For Mic (4D6963)–Mar (4D6172)=7F1 and Ric (526963)–Mic (4D6963)=500000, an average between both deltas is 283F8 and therefore a very rough approximation may be a next endpoint equaling Ric (526963)+283F8=54ED5B="T**".

Figure 6:
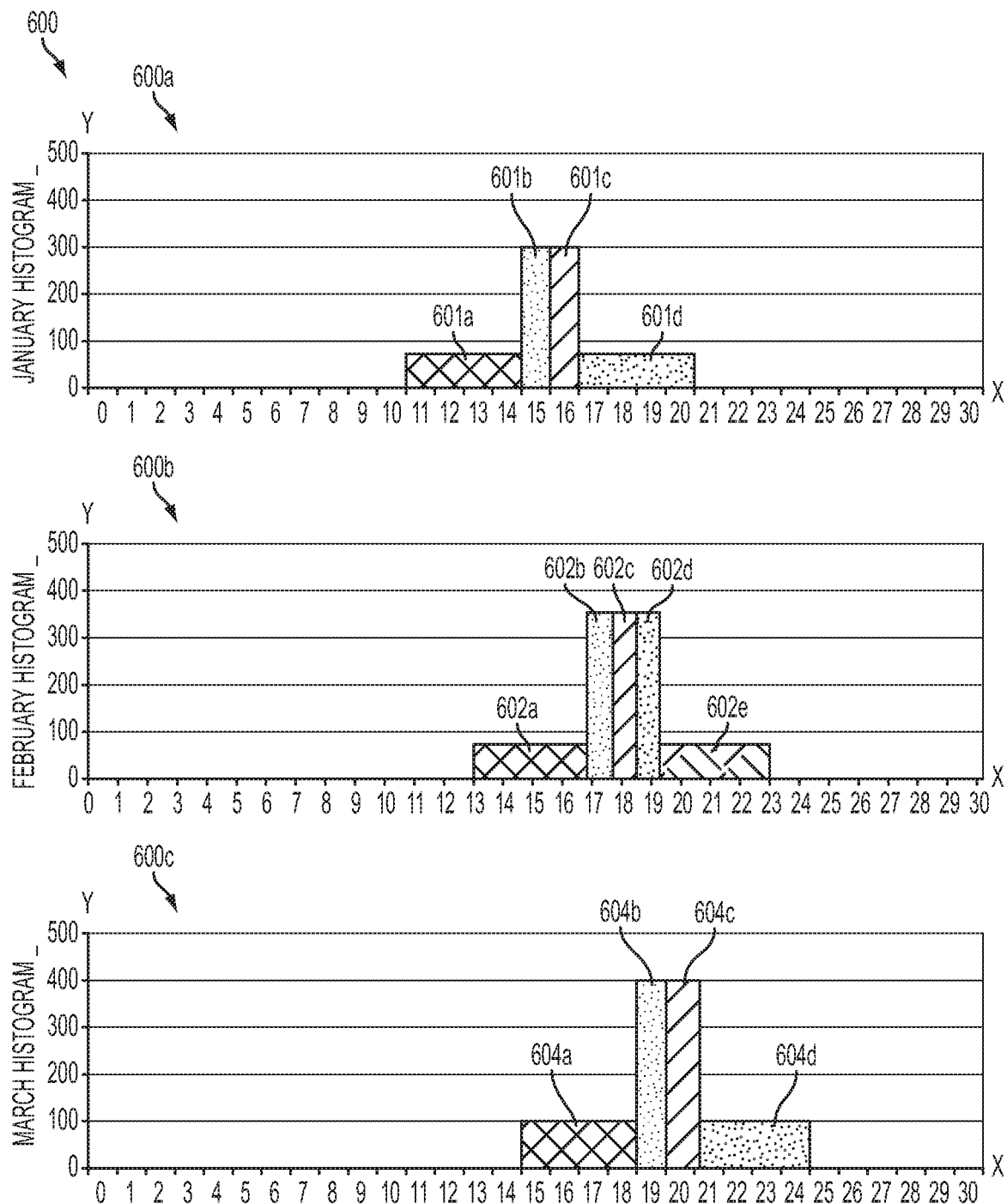
FIGS. 6-8 illustrate an implementation example describing a method for forecasting height balanced histograms, in accordance with embodiments of the present invention.
Figure 7:
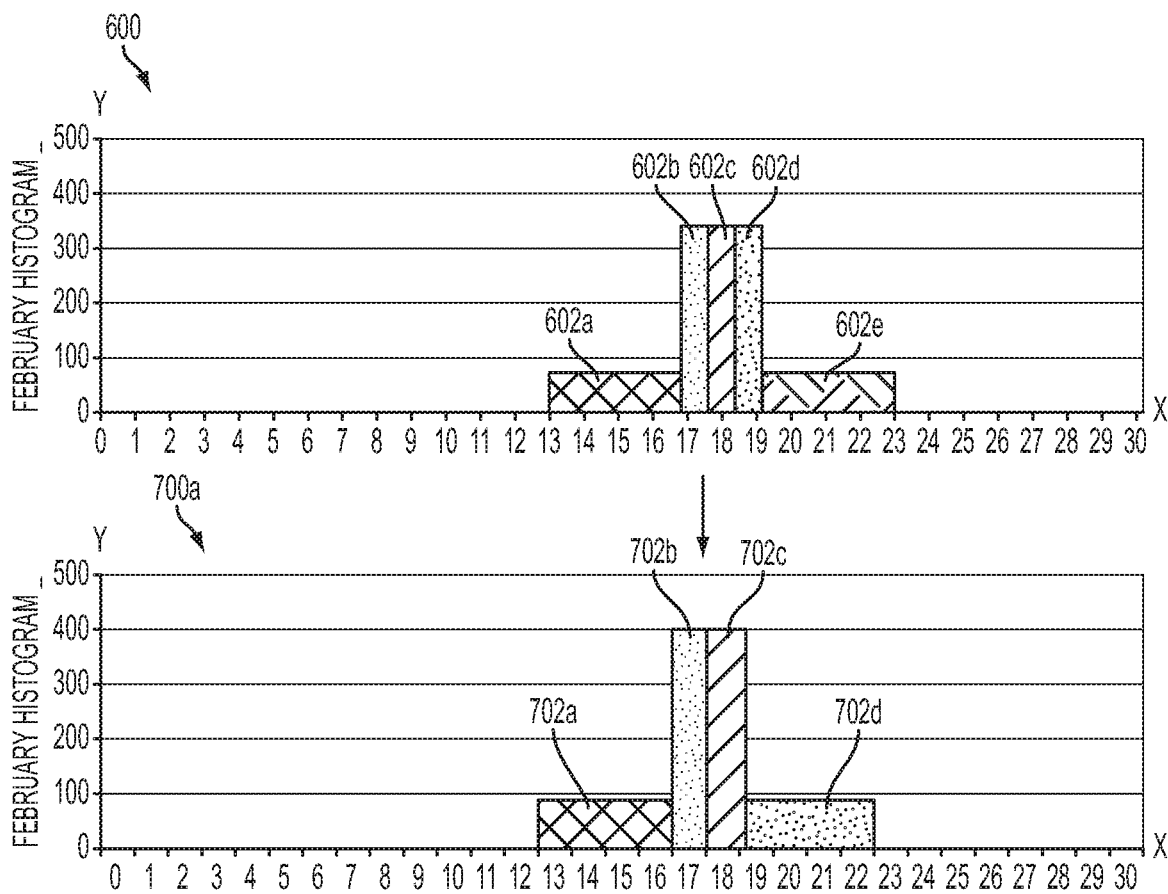
Figure 8:
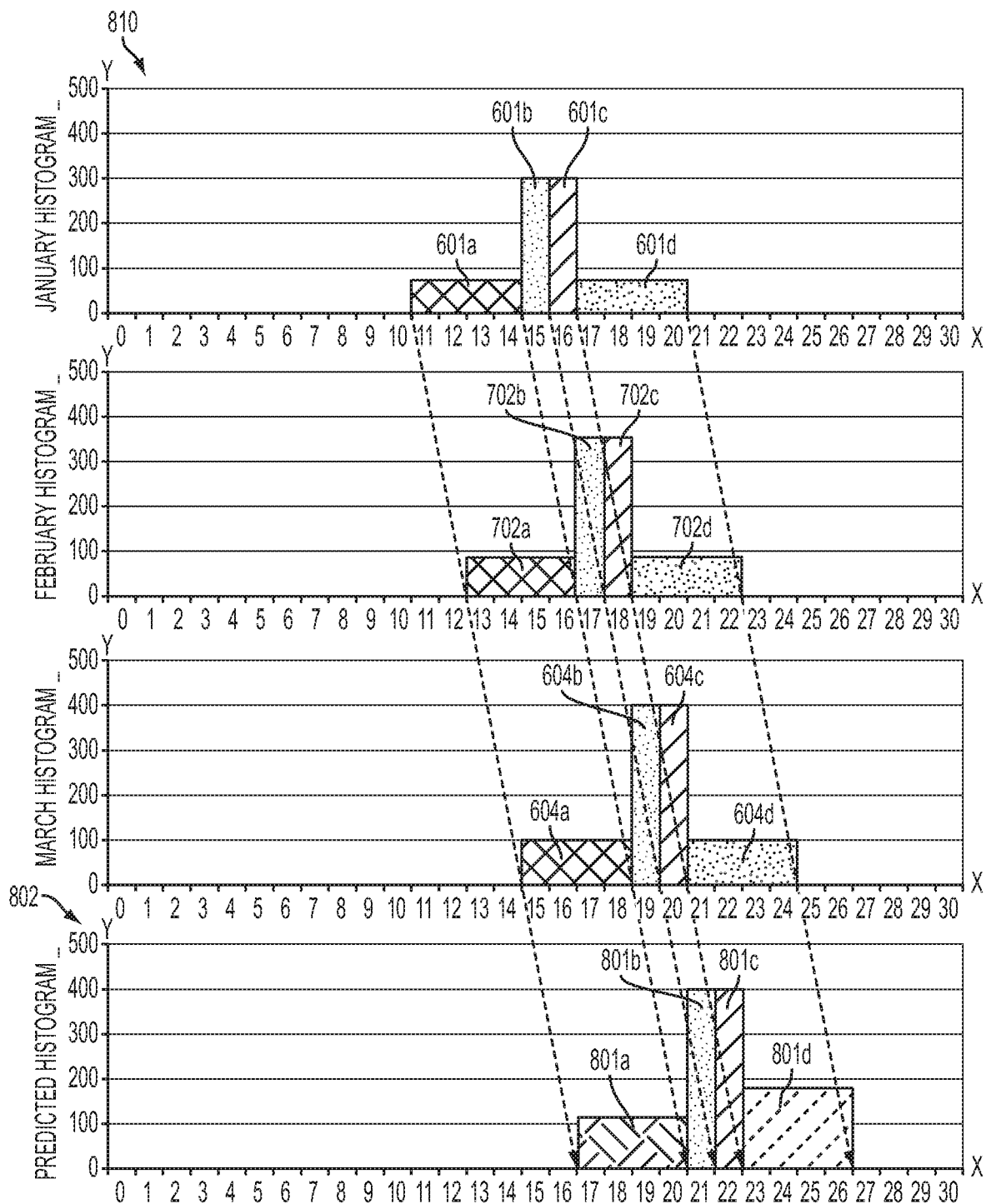

FIGS. 6, 7, and 8 illustrate an implementation example describing a method for forecasting height balanced histograms 600, in accordance with embodiments of the present invention. In order to forecast height balanced histograms 600 (in FIG. 7), the following attributes are retrieved:

In order to forecast height balanced histograms those 3 discussed attributes may be disclosed:

1. A minimum and maximum target value range configured to use lower and upper boundaries for providing a trend across time.
2. A differing number of possible target values comprising a number of bins to be normalized with respect to a SVM prediction for the number of bins (buckets or tiles).
3. A target value trend where each dimension comprises an associated trend thereby using an SVM algorithm.

Height balanced histograms 600 comprise a January frequency histogram 600a, a February frequency histogram 600b, and a March frequency histogram 600c generated based on based on a person column associated with "Hours spent on meetings".

For January all 4 bins are equi-depth to a 300 row count (i.e., 300 people per bin) and therefore 4 bins multiplied by a 300 row count equals 1200 total people as follows:

1. Bin 601a=300 people spent 11-14 hours on meetings.
2. Bin 601b=300 people spent 15 hours on meetings.
3. Bin 601c=300 people spent 16 hours on meetings.
4. Bin 601d=300 people spent 17-20 hours on meetings.

For February all 5 bins are equi-depth to 280 row count (i.e., 280 people per bin) and therefore 5 bins multiplied by a 280 row count equals 1400 total people as follows:

1. Bin 602a=280 people spent 13-16.79 hours on meetings.
2. Bin 602b=280 people spent 16.80-17.59 hours on meetings.
3. Bin 602c=280 people spent 17.60-18.39 hours on meetings.
4. Bin 602d=280 people spent 18.40-19.19 hours on meetings.
5. Bin 602e=280 people spent 19.20-to 22 hours on meetings.

For March all 4 bins are equi-depth to a 400 row count (i.e., 400 people per bin) and therefore 4 bins multiplied by a 400 row count equals 1600 total people as follows:

1. Bin 604a=400 people spent 15-18 hours on meetings.
2. Bin 604b=400 people spent 19 hours on meetings.
3. Bin 604c=400 people spent 20 hours on meetings.
4. Bin 604d=400 people spent 21-24 hours on meetings.

Based on the preceding histograms, it is determined that in February there were 5 bins in contrast with 4 bins found in January and March. For example, the SVM algorithm has predicted 4 bins for April and therefore all the January, February, and March histograms should be normalized to 4 bins. The only histogram with more than 4 bins is February and therefore in the transformation, only a number of bins and an equi-depth of bin must be changed as follows:

Original number of bins=5.
Original number of row count per bin=280.
Total count=5*280=1400.
Transformed number of bins=4.
Transformed number of row count per bin=Total count/Transformed number of bins=1400/4=350.

With respect to a transformed bin 602a, an entire original bin 602a with 280 rows may be taken in combination with 70 rows from the bin 602b to reach 350 rows. 70 out of 280 rows from the bin 602b represents 70/280=25%. Therefore 25% of the original bin 602b width is advanced in the x axis (i.e., 16.80+25% of 0.8=17).

With respect to a transformed bin 602b, a remaining count of the bin 602b with 210 rows may be taken in combination with 140 rows from the original bin 602c to reach 350 rows. 140 out of 280 rows from the original bin 602c represents 140/280=50%. Therefore, 50% of the original bin 602c width is advanced in the x axis (i.e., 17.60+50% of 0.8=18).

With respect to a transformed bin 602c, a remaining count of the bin 602c with 140 rows may be taken with 210 rows from bin 602d to reach 350 rows. 210 out of 280 rows from the bin 602d represents 210/70=75%. Therefore, 75% of the bin 602d width is advanced in the x axis (i.e., 18.40+75% of 0.8=19).

With respect to a transformed bin 602d, a remaining count of the bin with 70 rows is taken in combination with 280 rows from the original bin 602d to reach 350 rows. 280 out of 280 rows from the original bin 602e represents 280/280=100%. Therefore, 100% of the original bin 602e width is advanced in the x axis (i.e., 19.20+100% of 0.8=20) thereby completing the process.

FIG. 7 illustrates the transformation of FIG. 6 with respect to bins 602a . . . 602e (for February) being normalized to bins 702a . . . 702d, in accordance with embodiments of the present invention.

FIG. 8 illustrates predictive histograms 800 generated from histograms 600 and 700a of FIGS. 6 and 7, in accordance with embodiments of the present invention. Histograms 800 illustrate predicted histogram 802 (i.e., for the month of March) generated from histograms 600 and normalized histograms 700a (i.e., for the month of February).

The following example pseudo language program comprises a blueprint associated with a histogram_x comprising an original histogram and a bins_count_y comprising a number of bins to normalize the histogram_x:

```
function normalized_histogram ( histogram_x , bins_count_y ) {
  factor = histogram_x.bins_count
  start_point = histogram_x.start_point
  for each bin_x in histogram_x {
    bin_x_fraction = ( bin_x.end_point - bin_x.start_point ) / bins_count_y
    while bins_count_y >= factor {
      end_point = bin_x.start_point + ( bin_x_fraction * factor )
      normalized_histogram.add_bin ( start_point, end_point )
      start_point = end_point
      factor = factor + histogram_x.bins_count
    }
    factor = factor - bins_count_y
  }
  return normalized_histogram
}.
```

Figure 9:
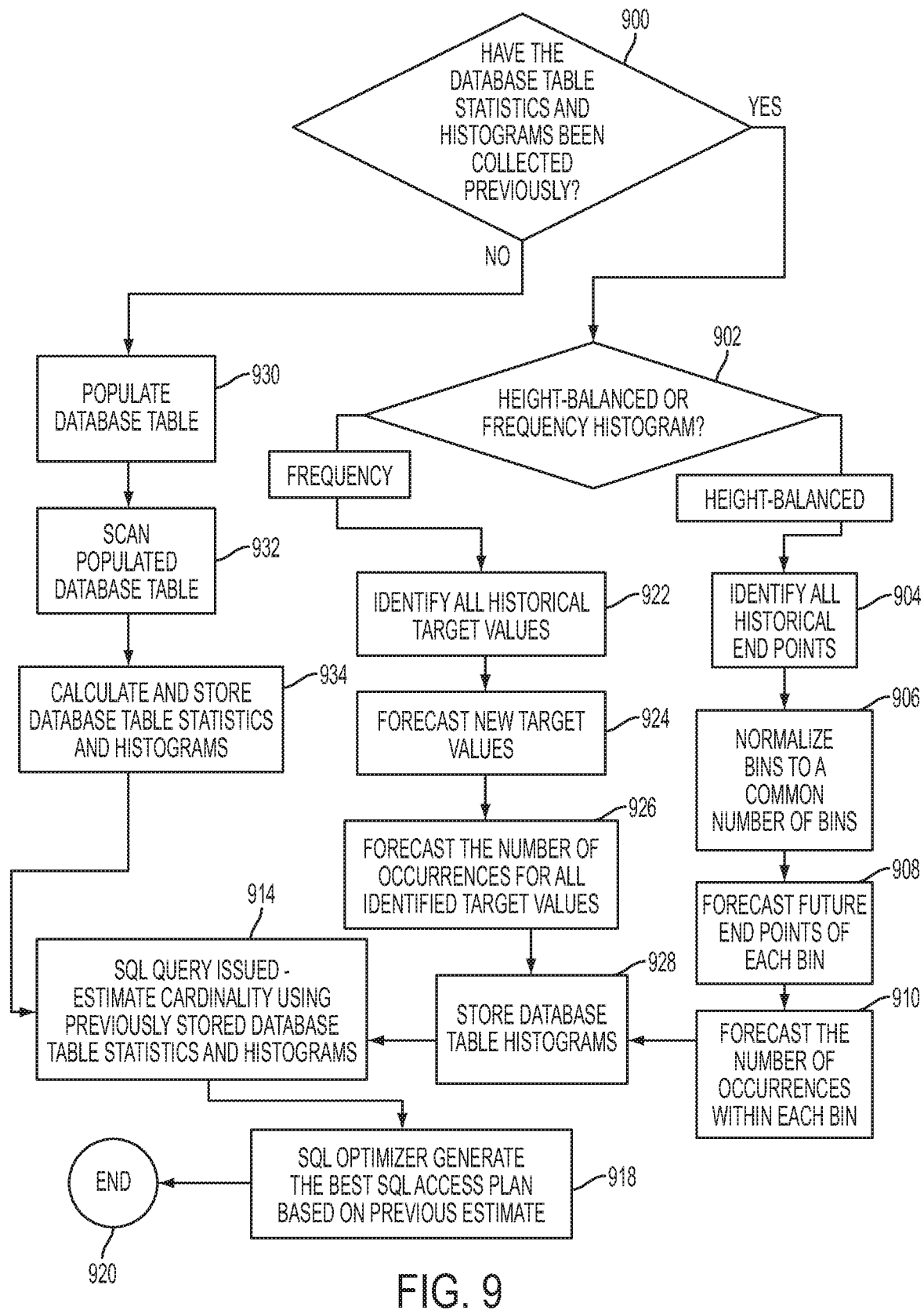
FIG. 9 illustrates a flowchart detailing a process enabled by the system of FIG. 4 for forecasting histograms based on database table statistics and historical statistical histograms associated with specified subject matter that has been previously retrieved, in accordance with embodiments of the present invention.

FIG. 9 illustrates a flowchart detailing a process enabled by system 400 of FIG. 4 for forecasting histograms based on database table statistics and historical statistical histograms associated with specified subject matter that has been previously retrieved, in accordance with embodiments of the present invention. In step 900, it is determined if database table statistics and historical statistical histograms have been previously retrieved.

If database table statistics and historical statistical histograms have not been previously retrieved then in step 930, a database table is populated resulting in a statistical and histogram update. In step 932, the populated database table is scanned via a complete scan or a partial scan. In step 934, database table statistics and histograms are calculated and stored. The calculations may include calculating a number of rows, a density of columns, a number of buckets (i.e., histograms), etc. In step 914, an SQL query is executed resulting in an estimation of cardinality using previously stored database table statistics and histograms. Step 914 is triggered by an SQL optimizer during an SQL query involving tables with previously collected statistics and histograms. In step 918, the SQL optimizer generates a best SQL access plan based on the estimation of step 914. This estimation is based on the previously collected statistics and histograms and provides the necessary information for a decision tree.

If database table statistics and historical statistical histograms have been previously retrieved then in step 902, it is determined if the historical histograms comprise frequency based histograms or height-balanced histograms.

If the historical histograms comprise frequency based histograms then in step 922, all historical target values of the histograms are identified. The historical target values must be listed and each target value reveals a single dimension. In step 924, new target values associated with the historical target values are forecast. The new target values are forecast by determining values crossing historical lower and upper boundaries. Additionally, the new target values may be identified and revealed by analyzing a delta trend provided by a SVM algorithm. In step 926, a value identifying a number of occurrences for identified target values comprising new target values and historical target values are forecast. Each identified target value (e.g., represented by a bin in the histogram) comprises a specified dimension. Each specified dimension may comprise an associated trend identified by the SVM algorithm. In step 928, database table histograms comprising the identified target values are stored and steps 914 and 918 are executed as described, supra.

If the historical histograms comprise height-balanced histograms then in step 904, historical endpoint values associated with the historical statistical histograms are identified. The historical endpoint values may be identified by determining values crossing lower and upper boundaries thereby providing a trend across time. The trend may be identified by an SVM algorithm. In step 906, differing bins (of the historical statistical histograms) are normalized to a common number of bins. For example, table partition histograms or historical histograms of a same table may include a different number of bins. Therefore it may be necessary to normalize each table partition histogram or historical histogram to a common number of bins. In step 908, future endpoint values associated with each bin of the common number of bins are forecast based on the historical endpoint values. Each dimension may include an associated trend thereby using a SVM algorithm. In step 910, a value identifying a number of occurrences of the future endpoint values within each bin is forecast. Each bin may include a similar number of occurrences but due to the fact the endpoint values may include "popular" values, a number of occurrences within each bin may vary and a SVM algorithm may be applied to identify this trend. In step 928, database table histograms comprising the identified target values are stored and steps 914 and 918 are executed as described, supra.

Figure 10:
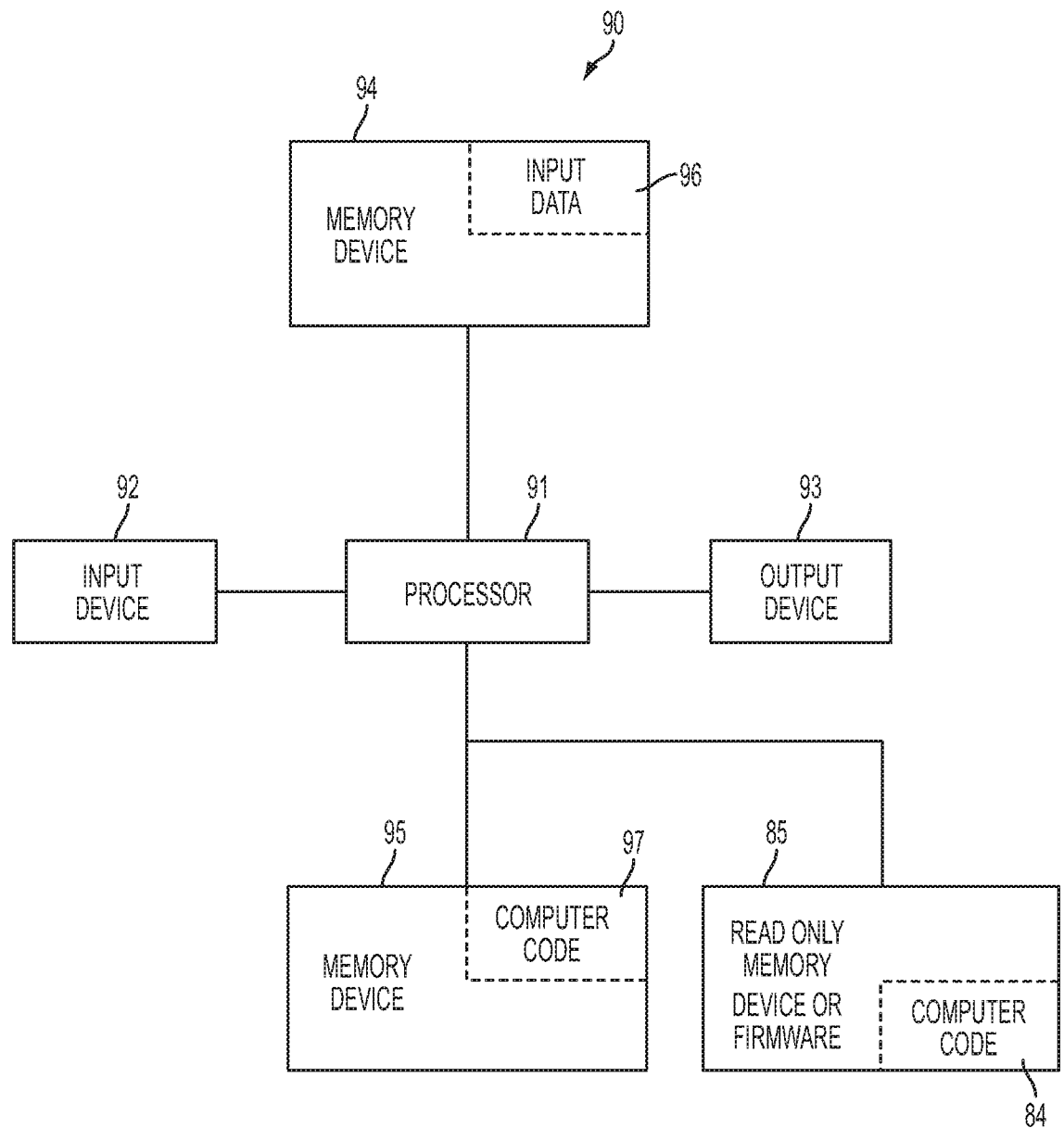
FIG. 10 illustrates a computer system for forecasting histograms based on database table statistics and historical statistical histograms associated with specified subject matter that has been previously retrieved, in accordance with embodiments of the present invention.

FIG. 10 illustrates a computer system 90 (e.g., database computing system 402 of FIG. 4) for forecasting histograms based on database table statistics and historical statistical histograms associated with specified subject matter that has been previously retrieved, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 10 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 9) for forecasting histograms based on database table statistics and historical statistical histograms associated with specified subject matter that has been previously retrieved. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIG. 9 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIG. 9) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to forecast histograms based on database table statistics and historical statistical histograms associated with specified subject matter that has been previously retrieved. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for forecasting histograms based on database table statistics and historical statistical histograms associated with specified subject matter that has been previously retrieved. In another embodiment, the invention provides a business method that performs the process steps of the invention on a subscription, advertising, and/or fee basis. That is, a service supplier, such as a Solution Integrator, could offer to allow users to forecast histograms based on database table statistics and historical statistical histograms associated with specified subject matter that has been previously retrieved. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A histogram forecasting method comprising:
determining, by a computer processor of a database system, that a plurality of database table statistics and historical statistical histograms associated with specified subject matter have been previously retrieved, wherein said historical statistical histograms comprise frequency based histograms;
identifying, by said computer processor, historical target values associated with said historical statistical histograms;
presenting, by said processor via an x-axis, said historical target values;
presenting, by said processor via a y-axis, a row count for associated target values of said historical target values;
forecasting, by said computer processor in response to said presenting said historical target values and said presenting said row count, new target values associated with said historical target values;
forecasting, by said computer processor, a value identifying a number of occurrences for identified target values comprising said new target values and said historical target values;
storing, by said computer processor within said database system, database table histograms comprising said identified target values; and
executing, by said computer processor based on said database table histograms comprising said identified target values, a database partition scan providing accurate feedback to a data mining algorithm being executed for allocating optimized storage space of said database system with respect to partitions of said database system.

2. The method of claim 1, further comprising:
retrieving, by said computer processor reading a full set of said historical statistical histograms, said historical target values.

3. The method of claim 1, further comprising:
predicting, by said computer processor, a delta trend comprising a rate of said new target values crossing a lower boundary and an upper boundary of a minimum and a maximum target value range of said historical statistical histograms.

4. The method of claim 1, wherein each historical target value of said historical target values reveals a single dimension.

5. The method of claim 1, wherein each identified value of said identified target values comprises a specified dimension comprising an associated trend identified by said computer processor executing a support vector machine (SVM) algorithm.

6. The method of claim 1, further comprising:
providing at least one support service for at least one of creating, integrating, hosting, maintaining, and deploying computer-readable code in the database system, said code being executed by the computer processor to implement: said determining that said plurality of database table statistics and historical statistical histograms associated with said specified subject matter have been previously retrieved, said identifying, said forecasting said new target values, said forecasting said value, and said storing.

7. A database system comprising a memory and a computer processor coupled to said memory, said memory comprising instructions that when executed by the computer processor implement a histogram forecasting method comprising:
determining, by said computer processor, that a plurality of database table statistics and historical statistical histograms associated with specified subject matter have been previously retrieved, wherein said historical statistical histograms comprise frequency based histograms;
identifying, by said computer processor, historical target values associated with said historical statistical histograms;
presenting, by said processor via an x-axis, said historical target values;
presenting, by said processor via a y-axis, a row count for associated target values of said historical target values;
forecasting, by said computer processor in response to said presenting said historical target values and said presenting said row count, new target values associated with said historical target values;
forecasting, by said computer processor, a value identifying a number of occurrences for identified target values comprising said new target values and said historical target values;
storing, by said computer processor within said database system, database table histograms comprising said identified target values; and
executing, by said computer processor based on said database table histograms comprising said identified target values, a database partition scan providing accurate feedback to a data mining algorithm being executed for allocating optimized storage space of said database system with respect to partitions of said database system.

8. The database system of claim 7, wherein said method further comprises:
retrieving, by said computer processor reading a full set of said historical statistical histograms, said historical target values.

9. The database system of claim 7, wherein said method further comprises:
predicting, by said computer processor, a delta trend comprising a rate of said new target values crossing a lower boundary and an upper boundary of a minimum and a maximum target value range of said historical statistical histograms.

10. The database system of claim 7, wherein each historical target value of said historical target values reveals a single dimension.

11. The database system of claim 7, wherein each identified value of said identified target values comprises a specified dimension comprising an associated trend identified by said computer processor executing a support vector machine (SVM) algorithm.

12. A computer program product, comprising a computer readable hardware storage device storing a computer readable program code, said computer readable program code comprising an algorithm that when executed by a computer processor of a database system server implements a histogram forecasting method, said method comprising:
determining, by said computer processor, that a plurality of database table statistics and historical statistical histograms associated with specified subject matter have been previously retrieved;
identifying, by said computer processor, historical target values associated with said historical statistical histograms;
presenting, by said processor via an x-axis, said historical target values;
presenting, by said processor via a y-axis, a row count for associated target values of said historical target values;
forecasting, by said computer processor in response to said presenting said historical target values and said presenting said row count, new target values associated with said historical target values;
forecasting, by said computer processor, a value identifying a number of occurrences for identified target values comprising said new target values and said historical target values;
storing, by said computer processor within said database system, database table histograms comprising said identified target values; and
executing, by said computer processor based on said database table histograms comprising said identified target values, a database partition scan providing accurate feedback to a data mining algorithm being executed for allocating optimized storage space of said database system with respect to partitions of said database system.

13. The computer program product of claim 12, wherein said method further comprises:
retrieving, by said computer processor reading a full set of said historical statistical histograms, said historical target values.

14. The computer program product of claim 12, wherein said method further comprises:
predicting, by said computer processor, a delta trend comprising a rate of said new target values crossing a lower boundary and an upper boundary of a minimum and a maximum target value range of said historical statistical histograms.

15. The computer program product of claim 12, wherein each historical target value of said historical target values reveals a single dimension.

16. The computer program product of claim 12, wherein each identified value of said identified target values comprises a specified dimension comprising an associated trend identified by said computer processor executing a support vector machine (SVM) algorithm.

* * * * *